(12) United States Patent
Powell

(10) Patent No.: US 7,134,129 B2
(45) Date of Patent: Nov. 7, 2006

(54) DATA STORAGE DISC CARRIER WITH SELF CENTERING AND LOCKING STRUCTURES

(75) Inventor: Robin J. W. Powell, Yeovil (GB)

(73) Assignee: Westwind Air Bearings Ltd., Dorset (GB)

( * ) Notice: Subject to any disclaimer, the term of this patent is extended or adjusted under 35 U.S.C. 154(b) by 220 days.

(21) Appl. No.: 10/275,919

(22) PCT Filed: May 10, 2001

(86) PCT No.: PCT/GB01/02055

§ 371 (c)(1),
(2), (4) Date: Apr. 3, 2003

(87) PCT Pub. No.: WO01/88912

PCT Pub. Date: Nov. 22, 2001

(65) Prior Publication Data

US 2003/0156530 A1    Aug. 21, 2003

(30) Foreign Application Priority Data

May 15, 2000  (GB) ................................. 0011714.3

(51) Int. Cl.
*G11B 17/03* (2006.01)
(52) U.S. Cl. ................................... 720/706
(58) Field of Classification Search ................ 720/706, 720/707, 708, 714
See application file for complete search history.

(56) References Cited

U.S. PATENT DOCUMENTS

| | | | |
|---|---|---|---|
| 4,166,622 A | 9/1979 | Rager | 369/270.1 |
| 4,347,599 A | 8/1982 | Vitale | 720/706 |
| 4,472,713 A | 9/1984 | Breslow | 340/870.28 |
| 4,881,745 A | 11/1989 | Peters | 279/209 |
| 5,025,340 A | 6/1991 | Peters | 360/99.12 |
| 5,093,550 A | 3/1992 | Gerber et al. | 219/121.69 |
| 5,243,481 A | 9/1993 | Dunckley et al. | 360/99.08 |
| 5,270,999 A | 12/1993 | Chessman et al. | 720/722 |
| 5,436,775 A | 7/1995 | Ishimatsu | 360/98.08 |
| 5,548,454 A | 8/1996 | Kawakubo et al. | 360/72.1 |
| 5,659,443 A | 8/1997 | Berberich | 360/98.06 |
| 5,715,114 A | 2/1998 | Gotou | 360/98.08 |
| 5,781,374 A | 7/1998 | Moir et al. | 360/99.12 |
| 5,954,072 A | 9/1999 | Matusita | 134/149 |

(Continued)

FOREIGN PATENT DOCUMENTS

DE    38 16975 A1    11/1989

(Continued)

OTHER PUBLICATIONS

Patent Abstract of Japan, vol. 009, No. 020, p. 330; Jan. 26, 1985; & JP 59165282; Sep. 18, 1984; Takeshi, T: Magnetic Disc Fixing Mechanism.

(Continued)

*Primary Examiner*—David Davis
(74) *Attorney, Agent, or Firm*—Nixon & Vanderhye P.C.

(57) ABSTRACT

A disc holder for holding at least one media storage disc during rotation includes a central hub arranged for rotation about a central axis. The hub includes resilient centering arms which are arranged to provide an outwardly directed centering force on an internal bore of a carried disc in order to center the carried disc about the axis of rotation of the hub. The arms are disposed in, and movable in, planes which are substantially perpendicular to the axis of rotation of the hub. The disc holder may be arranged for carrying a stack of axially spaced media storage discs and may include axial gripping structure for holding the stack together. The gripping structure may include a central shaft which is held in position by ball shaped clamps which are spring loaded against inclined surfaces.

15 Claims, 3 Drawing Sheets

U.S. PATENT DOCUMENTS 6,487,162 B1 * 11/2002 Wu et al. .................. 720/708
2002/0129499 A1 9/2002 Khatchadourian et al. .... 30/319

FOREIGN PATENT DOCUMENTS

WO 93/26006 12/1993

OTHER PUBLICATIONS

Patent Abstract of Japan, JP 07263324; Oct. 13, 1995, Yasuhiro, M.; Suction Chuck Type Rotary Substrate Treating Device.

Malaysian Search Report Jun. 9, 2005.

* cited by examiner

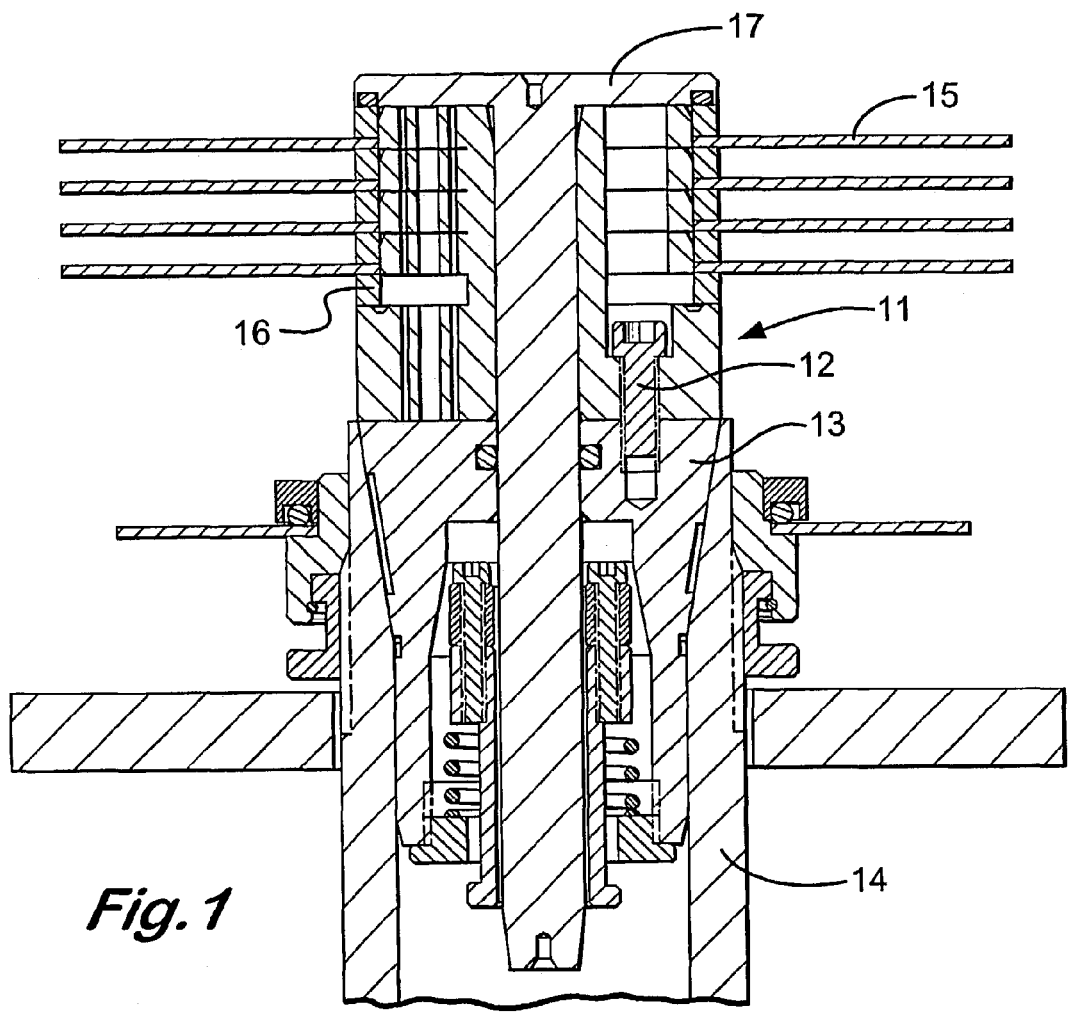
Fig.1
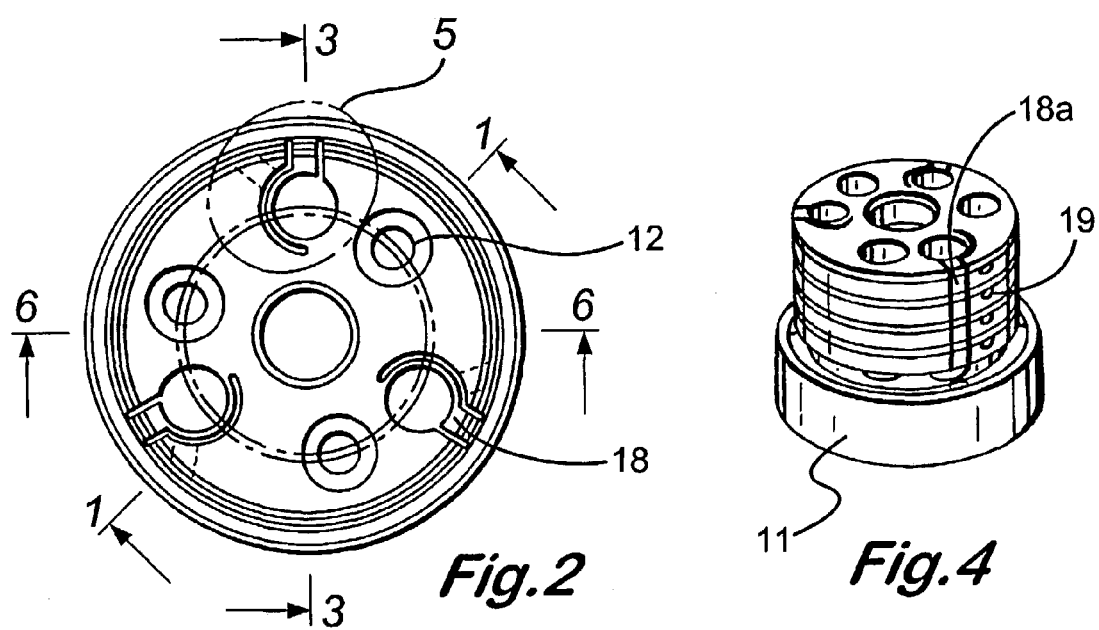
Fig.2
Fig.4

DATA STORAGE DISC CARRIER WITH SELF CENTERING AND LOCKING STRUCTURES

This application is the US national phase of international application PCT/GB01/02055 filed 10 May 2001, which designated the US.

BACKGROUND OF THE INVENTION

1. Technical Field

The present invention relates to the carrying of data storage discs in a precise disposition. In particular the invention relates to the manufacturing process for such discs wherein blank discs are provided with tracks and other basic structure.

2. Related Art

The data storage discs used in the invention may have data written in either magnetically or optically such as by laser beam, and include hard and floppy magnetic discs and CD Roms.

In general there is a desire to provide ever increasing data storage densities on storage discs. This is particularly important in the case of hard disc drives as used for example in PCs and laptop or notebook computers. More storage is required but the physical size of the hard drive needs to be minimized. In recent times such increased storage densities have been achieved largely by writing an ever increasing number of tracks onto the storage discs during manufacture. This means that if there are not to be track errors, the storage discs must be mounted extremely precisely. In some cases, the mounting needs to be to a greater precision than that to which internal bores of the discs themselves are produced. Further, for various reasons, the speed at which the discs are rotated during track writing cannot be increased indefinitely. This means that an increased number of tracks leads to an increased processing time. Thus it becomes particularly desirable to be able to write the tracks onto a number of discs simultaneously. Moreover it is desirable if it is possible to write the tracks of the discs before they are assembled into a stack in the final disc drive.

In these and other circumstances it can be desirable to be able to mount a stack of the discs in a manner which allows for precision rotation and writing to and reading from each disc, and which preferably allows subsequent releasing of the discs.

In such a case, the discs should be mounted as a stack so that each disc locates on a hub with accuracy and should be accurately centered with reference to a main axis of rotation. Moreover, there should be a space in the axial direction between each disc to permit reading and writing data on the disc.

BRIEF SUMMARY

Accordingly the exemplary embodiment of the present invention provides a disc holder for holding at least one media storage disc during rotation, said holder comprising a central hub arranged for rotation about a central axis and comprising means for carrying at least one media disc, said hub comprising resilient centering means arranged to provide an outwardly directed centering force on an internal bore of a carried disc in order to center the carried disc about the axis of rotation of the hub.

Preferably the disc holder is for holding a stack of axially spaced media storage discs and the resilient centering means is arranged for each storage disc.

Preferably the or each storage disc is removably mountable on the hub.

Preferably the resilient centering means will comprise at least three resilient centering arms acting on the or each disc.

Dependent on the number of arms, the arms should either be equi-spaced around the rotational axis or be in a configuration which provides equalized centering forces around that axis. The arms can be in the form of arcuate leaf springs, and the resilient strength of each should be the same or should be balanced about the hub center of rotation.

Preferably the arms are each formed of material integral or monolithic with the hub. Each arm may be an arcuate arm extending from a region of the hub which allows the arm to resiliently flex inwards and/or outwards to contact the internal bore of the disc. Each arm may be located at the edge of a circular aperture, which permits easy manufacture and allows the arm to flex without constraint. A further aperture may be provided externally of the arcuate arm to facilitate mounting and/or removal of its disc. A tool can be provided which when inserted in the aperture forces the arm radially inwards so facilitating mounting and/or release of the disc.

The purpose of the resilient arms is to accurately center the media disc(s) for rotation. Although the arms may provide a gripping action which tends to cause the disc(s) and hub to rotate as a whole, it is preferred if separate means are provided for this function.

The disc holder may comprise axial gripping means to ensure that the or each carried disc and the hub rotate as a whole. Where there is a stack of discs, the axial gripping means may hold together the stack of discs and spacing rings between the discs.

The axial gripping means may have a central shaft which is held in position by at least two clamps which are spring loaded against inclined surfaces. The surfaces are inclined with respect to the axial direction so that pulling the shaft in one direction forces the clamps up the inclined surfaces and thereby tightens the clamping force on the central shaft. The clamps are preferably of arcuate section, for example balls, which can rotate so as to ride up the respective inclined surfaces to increase the clamping force. Preferably the clamps are inwardly directed and the surfaces are inwardly inclined with respect to the axial direction.

The shaft may comprise an enlarged end for contacting with and retaining the stack. The shaft may be generally T-section.

Such arrangements are provided so that it is a simple matter to load a plurality of discs and spacers onto a hub and insert and push down the shaft of the axial gripping means to achieve a stack ready for processing. As upward movement of the shaft is prevented, suitable releasing means is typically activated when dis-assembling the stack.

According to another aspect of the invention there is provided, a disc holder for a stack of axially spaced media storage discs comprising axial gripping means for holding the stack together and having a central shaft which is held in position by at least two clamps which are spring loaded against inclined surfaces. The surfaces are inclined with respect to the axial direction so that pulling the shaft in one direction forces the clamps up the inclined surfaces and thereby tightens the clamping force on the central shaft. The clamps are preferably of arcuate section, for example balls, which can rotate so as to ride up the respective inclined surfaces to increase the clamping force. Preferably the clamps are inwardly directed and the surfaces are inwardly inclined with respect to the axial direction.

BRIEF DESCRIPTION OF THE DRAWINGS

Embodiments of the invention will now be described by way of example with reference to the accompanying diagrammatic drawings in which:—

FIG. 1 is a side elevation of a disc holder hub sectioned on the line 1—1 of FIG. 2;

FIG. 2 is a plan view of the disc holder hub of FIG. 1;

FIG. 4 is a perspective view of the hub;

DETAILED DESCRIPTION OF EXEMPLARY EMBODIMENTS

Figure 3:
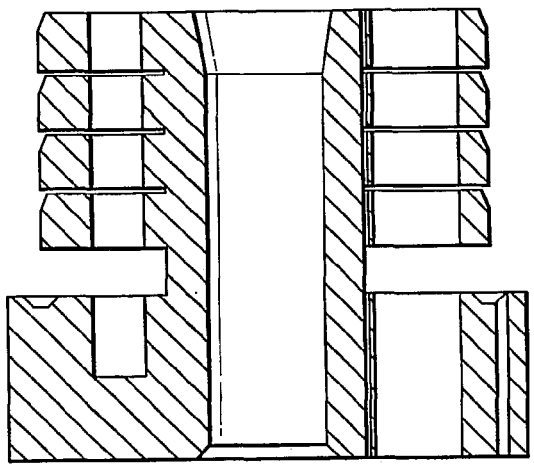
FIG. 3 is a side view of the hub sectioned on the line 3—3 of FIG. 2.

Referring to FIG. 1, a hub 11 is clamped by three bolts 12 to a lower collet 13 which is held within a rotary carrier 14 having rotary driving means at its base end (not shown).

The disc holder shown is arranged to carry a stack of four media storage discs 15 although other numbers of media discs could be carried in a similar device with the necessary and obvious changes with reference to the described arrangement.

Figure 7:
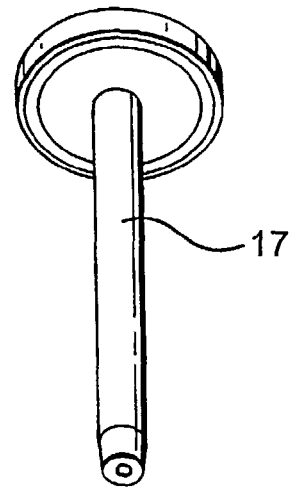
FIG. 7 is a perspective view of an axial gripping shaft.

The four discs 15 are held in a spaced relation by five spacer rings 16. The spacer rings and media discs 15 are held in position by a central axial T-section gripping shaft 17. The T-section shaft 17 is shown in perspective in FIG. 7.

The disc holder hub 11 in this embodiment is so dimensioned that media discs 15 can be slipped over the hub 11 with only a relatively small resistance. This is because the external diameter of the disc carrying portion of the hub 11 is generally slightly smaller than the internal diameter of the bore of the disc to be carried.

Figure 5:
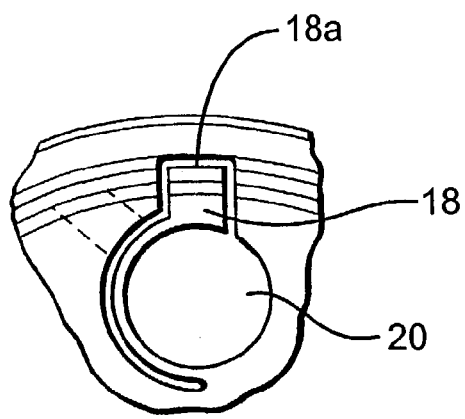
FIG. 5 is an enlarged fragment from FIG. 2 marked as 5.

However as most clearly seen in FIGS. 2, 4 and 5, a plurality of radial centering arms 18 are provided which contact the bore of a carried disc. In this case there is a separate set of three arms 18 acting on each disc. The three arms 18 in each set are equi-spaced, arcuate in shape, and have relatively thin portions so as to provide resilient movability in a radial direction. The arms 18 are disposed in, and moveable in, planes which are substantially perpendicular to the axis of the hub 11.

The three centering arms 18 are machined so that, in their rest positions, an outer peripheral surface contour 18a of each arm 18 projects slightly beyond the external diameter of the remainder of the disc carrying portion of the hub 11. The amount which each outer surface 18a projects is too small to be clearly seen in the drawings. The exact extent of projection will depend on design choice but typically may be in the region of a few thousandths of an inch (hundredths of a mm). The arms 18 deflect slightly as discs are passed over them and as each disc is located into its final position.

To ensure that the arms 18 can be machined so as to project by the correct amount, grub screw holes 19 (see FIG. 4) are provided so that the machined arms 18 can be positioned radially inwards via grub screws thus allowing machining of the external diameter of the hub.

Figure 9:
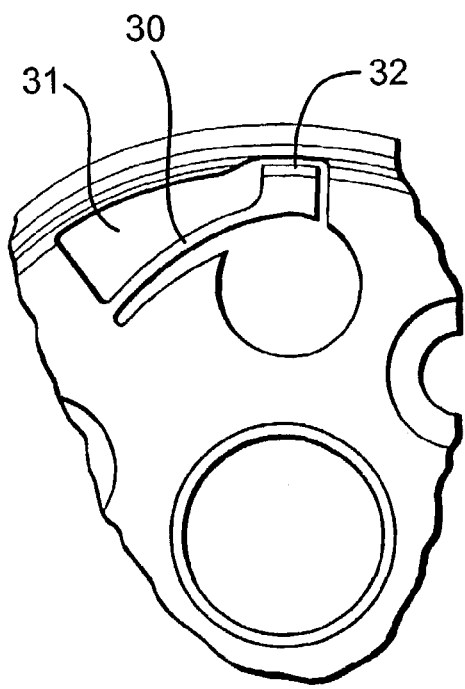
Figure 10:
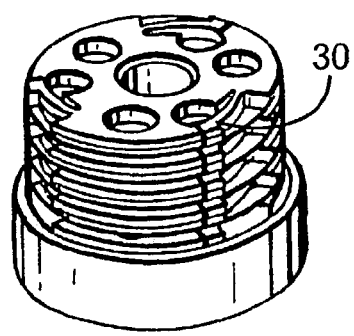
Figure 8:
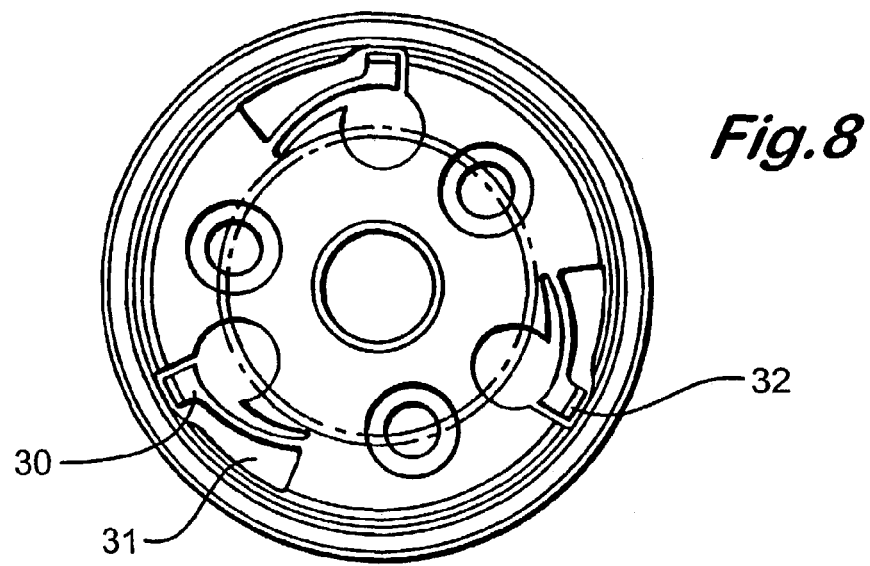
FIG. 8 (plan), FIG. 9 (enlarged fragment from FIG. 8), and FIG. 10 (perspective) show an alternative disc holder.

In an alternative disc holder shown in FIGS. 8, 9 and 10 different shaped centering arms 30 are provided. The ends of these centering arms 30 are again arranged to be proud of the periphery of the hub 11 so that they are in a resilient gripping relationship with carried media discs. A generally trapezoidal hole 31 is provided axially in the region of each arm to aid in loading and removal of the discs. The axial holes 31 provided in the region outside the arcuate arms 30 enable insertion of a tool for forcing the arms 30 radially inwards to facilitate loading and removal of the discs. The tool has projections which are locatable in each trapezoidal hole. The tool is rotated into position relative to the hub 11 to move the ends of the arms 30 to retracted positions. The profile of each arm in the region of the trapezoidal holes, is such as to present a ramp to the respective projection of the tool during rotation to withdraw the arms.

Further, in this device the outer end of each arm 30 has slight bevel edges 32 to aid the internal bore of each disc in sliding over the ends of the arms 30 during loading and unloading.

In both holders described above the hub 11, and in particular, the disc carrying portion of the hub 11, is machined from a single piece of material. This ensures that the characteristics of each resilient arm 18, 30 acting on a single disc are substantially identical. This ensures that as far as possible a carried disc is precisely centered, the arms 18, 30 taking up any clearance between the hub 11 and bore of the disc due to manufacturing tolerances of the disc. In some cases centering may be improved by a factor of 50 to 100 times that of the disc bore tolerance.

In certain cases it may be found necessary or convenient to use two or more pieces of material in manufacture of the hub. However, in such cases, the arms may still be formed of material integral or monolithic with the hub. That is to say to give the advantages of ease of manufacture and consistency of characteristics between the arms, each arm may be integral with a respective part of the hub. In one example, a set of arms associated with one disc may be integral with a first part of the hub and another set of arms associated with another disc may be integral with a second part of the hub.

At least the critical parts of the hub may be machined by electrical discharge machining to obtain the desired accuracy. The hub 11 is typically of steel and the spacers 16 of Aluminium.

Figure 6:
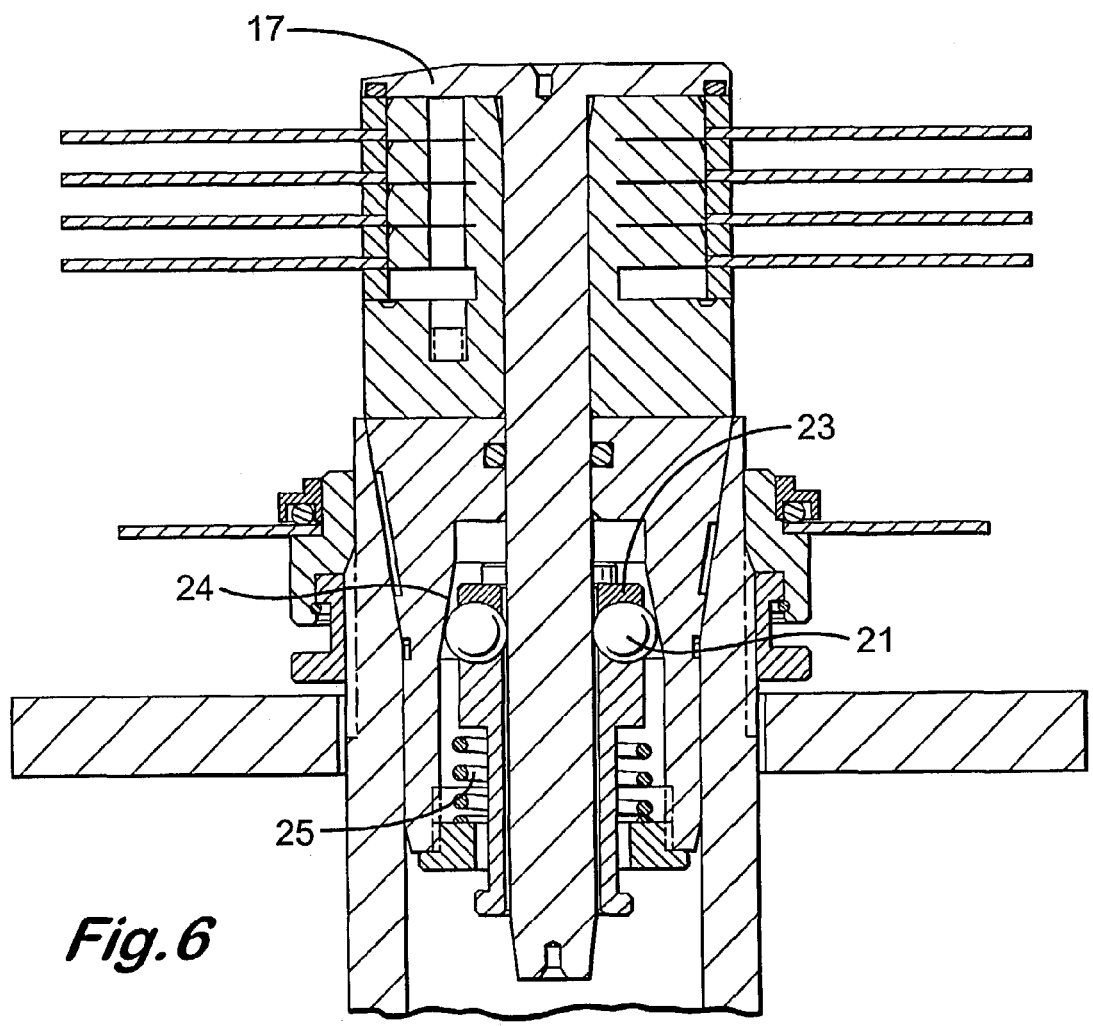
FIG. 6 is a sectional view of the disc holder of FIG. 1 but sectioned on the line 6—6 of FIG. 2.

In both holders described above, although the arms 18, 30 provide centering, carried discs are axially clamped before rotation. The axial clamping is provided after the discs have been centered and the axial clamping force exerted on the discs is much greater than any radial griping force provided by the radial arms 18,30. The axial shaft 17 holding the stack together is clamped in position by spring loaded balls 21 (see FIG. 6) which are kept in position by bolts 22 (see FIG. 1) holding the balls within a spring loaded cage 23 which permits the balls to rotate. The balls 21, as well as bearing against the shaft 17, also bear against a bearing surface 24 which is inwardly inclined with respect to the central axis of the device. A spring 25 holds the balls resiliently in this position by providing an axial loading on the cage 23.

This arrangement allows the axial shaft 17 to be inserted into the device and the balls to rotate during this action. However, while the balls can rotate together with the motion of inserting the axial shaft 17, any movement to remove the shaft 17 causes the balls to ride up the inclined surfaces 24 and tighten their grip on the shaft. Thus, the balls provide a one-way gripping action on the shaft 17. After use the balls can be released by use of a tool to compress the spring 25 and release the loading on the cage 23.

In use, a stack of discs 15 and spacers 16 are loaded onto the hub 11 and the respective arms 18, 30 center each of the discs 15. The axial shaft 17 is then inserted and pushed fully down to provide axial clamping on the discs 15, via the spacers 16, to ensure that the discs 16 and hub 11 will rotate as a whole.

After the discs have been processed, for example by writing tracks thereon, the axial shaft 17 is released and removed and the discs 15 removed for assembly into a final disc drive unit.

Although particularly suitable for use in the manufacture of hard disc drive units, carriers like or similar to those described above may be used in other circumstances such as writing and/or reading such media discs or any other media discs in manufacture, testing or final use.

The invention claimed is:

1. A disc holder for holding at least one media storage disc during rotation, said holder comprising:
    a central hub arranged for rotation about a central axis and arranged for carrying at least one media disc, wherein said hub comprises a resilient centering arrangement comprising at least one plurality of resilient arms arranged to provide an outwardly directed centering force on an internal bore of a carried disc in order to center the carried disc about the axis of rotation of the hub, the plurality of arms being disposed in, and movable in, a plane which is substantially perpendicular to the axis of rotation of the hub; and
    an axial gripping arrangement to ensure that the at least one carried disc and hub rotate as a whole;
    wherein the axial gripping arrangement has a central shaft which is held in position by at least two clamps which are spring loaded against inclined surfaces.

2. A disc holder as in claim 1 which is arranged for holding a stack of axially spaced media storage discs wherein the resilient centering arrangement comprises a respective plurality of resilient arms for centering each storage disc.

3. A disc holder as in claim 1 in which the at least one storage disc is removably mountable on the hub.

4. A disc holder as in claim 1 in which the resilient centering arrangement comprises at least three resilient centering arms acting on the at least one storage disc.

5. A disc holder as in claim 1 in which the arms are arranged in a configuration which provides equalized centering forces around the rotational axis.

6. A disc holder as in claim 1 in which the arms are in the form of arcuate leaf springs.

7. A disc holder as in claim 1 in which the arms are each formed of material integral with the hub.

8. A disc holder as in claim 7 in which the hub including all of the arms is formed of a single piece of material.

9. A disc holder as in claim 1 in which the hub defines a plurality of generally circular apertures and each arm is located at the edge of a respective one of the generally circular apertures.

10. A disc holder as in claim 1 in which the surfaces are inclined with respect to the axial direction so that pulling the shaft in one direction forces the clamps up the inclined surfaces and thereby tightens the clamping force on the central shaft.

11. A disc holder as in claim 10 in which the clamps are of arcuate section which can rotate so as to ride up the respective inclined surfaces to increase the clamping force.

12. A disc holder as in claim 1 which is arranged for holding a stack of axially spaced media storage discs wherein the axial gripping arrangement is arranged for holding the stack together.

13. A disc holder as in claim 12 in which the shaft comprises an enlarged end for contacting with and retaining the stack.

14. A disc holder as in claim 13 in which the shaft is generally T-section.

15. A disc holder for holding a stack of axially spaced media storage discs and comprising axial gripping for gripping each of the storage discs in the stack and holding the stack together, wherein the gripping means comprises a central shaft which is held in position by at least two clamps which are spring loaded against inclined surfaces.

* * * * *